Patented May 15, 1951

2,553,217

UNITED STATES PATENT OFFICE 2,553,217

CYCLIC ORGANIC FLUORINE COMPOUNDS AND METHOD OF MAKING

Frederic B. Stilmar, Wilmington, Del., assignor to the United States of America as represented by the United States Atomic Energy Commission No Drawing. Application August 14, 1947, Serial No. 768,711

5 Claims. (Cl. 260—648)

This invention relates to the manufacture of cyclic fluorine compounds and is particularly concerned with the development of a process for the production of cyclic fluorine compounds having at least one fluorinated alicyclic group at lower costs than is possible by previous processes.

In the past it has been proposed to prepare cyclic fluorine compounds by several methods. However all of these methods involve either a hydrogenation step or the use, directly or indirectly, of elemental fluorine, a reagent which is difficult to produce and handle and consequently adds greatly to the cost of products whose production involves its use.

It is an object of the present invention to prepare cyclic fluorine compounds by a more economical process than hitherto employed and particularly to prepare highly fluorinated cyclic products by means of fluorinating agents other than fluorine or compounds whose manufacture requires its use.

Further objects are the preparation of new high molecular weight products of high stability to oxidizing agents and possessing other valuable attributes, the preparation of new and valuable highly fluorinated compounds containing eighteen or more carbon atoms in the form of alicyclic rings with or without heterocyclic structures, the preparation of new oils and waxes of high fluorine content and unusual stability.

Yet further objects of the invention will appear from the description of the invention to follow.

In accordance with the present invention, organic compounds containing one or more chlorinated aromatic nuclei are acted upon by a fluorinating agent of the group consisting of antimony pentafluoride and arsenic pentafluoride to effect a simultaneous replacement of chlorine by fluorine and saturation of double bonds to produce progressively more saturated compounds.

In carrying out the process of the invention it is not necessary that chlorinated compounds having no hydrogen atoms be used as starting materials, but this is desirable in that any hydrogen present consumes a portion of the fluorinating agent in forming hydrogen fluoride. Moreover if a high proportion of hydrogen is not substituted by chlorine, the fluorination reaction tends to become violent and results in undesirable decomposition and degradation products, and yields of the desired products are reduced. Normally these tendencies are not serious in compounds having three-fourths or more of the hydrogen replaced by chlorine. Although the compounds employed in the process may include substituents which react with the fluorinating agent, it is preferred that, if, in addition to chlorine substituents, other functional groups be present, they be of either or both of two types:

(1) Groups not affected by the fluorinating agent, and (2) Groups which are merely replaced or fluorinated by the fluorinating agent.

The process of the invention is applicable to the production of monocyclic and polycyclic products comprising 6-carbon rings. In the case of polycyclic compounds, the process is applicable to the production of condensed ring structures as well as rings united by a single bond or non-carbon linkages or both.

The process has been found to be especially advantageous for the preparation of mixtures of chlorofluoro compounds possessing an oily physical character. While it is not intended to limit the invention to any particular theory, it is believed that these oily characteristics are due to the presence of many isomeric compounds having the same carbon skeleton but differing in the relative positions of chlorine and fluorine atoms. Thus for the o-terphenyl derivatives, $C_{18}ClF_{31}$ there are seven possible isomers, and for the derivatives $C_{18}Cl_2F_{30}$ there are many times this number of possible isomers differing only in the positions of the two Cl atoms. Particularly valuable highly fluorinated oils prepared in this manner have contained from 18 to 24 carbon atoms in 6-carbon rings and from 5% to 35% of residual chlorine and sometimes an atom or two of hydrogen so located in the molecule that it is extremely resistant to oxidation or dehydrohalogenation.

By treating hexachlorobenzene, $C_6Cl_6$, by the process of the present invention, fluorochlorocyclic compounds may be produced varying from low fluorine content and high chlorine content to the perfluorocyclohexane, $C_6F_{12}$. This product normally is obtained mixed with monochloroperfluorocyclohexane, $C_6ClF_{11}$, and smaller quantities of dichloroperfluorocyclohexane $C_6Cl_2F_{10}$.

By the treatment of octachloronaphthalene, $C_{10}Cl_8$, with antimony pentafluoride, the octachloronaphthalene is converted progressively to products of higher fluorine content and fewer double bonds until the completely saturated perfluorodecalin, $C_{10}F_{18}$, is produced.

By the treatment of perchlorodiphenyl, $C_6Cl_5.C_6Cl_5$, this compound may be converted to progressively more highly saturated and fluorinated products up to perfluorodicyclohexyl, $C_6F_{11}.C_6F_{11}$.

Similar conversion products are obtained from other perchloroaromatic compounds, such as perchloro-o-, -m-, or -p-terphenyl $(C_6Cl_5.C_6Cl_4.C_6Cl_5)$, perchloro-1,3,5-triphenylbenzene $((C_6Cl_5)_3C_6Cl_3)$, perchloro-o, o'-diphenyl-diphenyl $(C_6Cl_5.C_6Cl_4.C_6Cl_4.C_6Cl_5)$, and perchloro-triphenylene $(C_6Cl_4)_3$, and from the highly chlorinated derivatives of carbazole $(C_{12}H_3NH)$, N-phenyl carbazole $(C_{12}H_8NC_6H_5)$, triphenylamine $((C_6H_5)_3N)$, diphenylene oxide $(C_{12}H_8O)$, and dinaphthylene oxide $(C_{20}H_{12}O)$.

Although aromatic compounds containing aliphatic substituents may be used as starting materials, they normally lose such substituents by scission during the fluorination process.

The process may be carried out simply by heating the chlorinated aromatic hydrocarbon with antimony pentafluoride. Reaction temperatures below the point of substantial decomposition are employed, and, in general, preferred temperatures lie between about 100° C. and about 300° C. Low temperatures are frequently more satisfactory for effecting a low degree of fluorination and high temperatures for effecting a high degree of fluorination.

Normally, to produce a completely saturated compound it is desirable to conduct the process in a series of steps, effecting a partial fluorination with or without partial saturation in the first step and further fluorination and saturation in a subsequent step or steps employing fresh antimony pentafluoride in each step. Thus the process may be conducted to produce, in the first step, a perfluorochloro aromatic compound or hydroaromatic compound. The product may be separated from unreacted starting materials and antimony salts in any suitable manner, such as by adding a selective solvent for the organic or inorganic materials and separating the solution from undissolved material by decantation or centrifugation. The organic reaction product, either with or without further purification, is then treated with fresh antimony pentafluoride to effect further replacement of chlorine and saturation to form a more completely fluorinated compound or mixture of compounds. The amount of antimony pentafluoride employed in the first step is not critical but preferably is between one-half and one times the amount theoretically required for the entire fluorination on the basis that each molecule of antimony pentafluoride supplies one and one-third atoms of fluorine.

The following examples will further illustrate the process of the invention:

EXAMPLE 1

A mixture of 330 grams of hexachlorobenzene (M. W. 285) and 750 grams of antimony pentafluoride (M. W. 217) are heated for 6 hours at 250° C. in an aluminum autoclave under autogenous pressure. The reaction mixture is then drowned in dilute aqueous hydrochloric acid-ice mixture to dissolve antimony salts. The mixture is filtered to separate unreacted or slightly reacted hexachlorobenzene (93 grams) and an oil is then separated from the aqueous filtrate. This oil is washed with water and dried by contact with calcium chloride. There are recovered 215 grams of an oil product which upon distillation yields 183 grams of a colorless fluid liquid boiling from 120° C. to 190° C. This product possesses a refractive index of 1.389, contains about 29% chlorine, and comprises dichloro-perfluorobenzene (32.4% Cl) and dichloroperfluoro-cyclohexadiene (27.6% Cl).

28 grams of the product are mixed with 215 grams of antimony pentafluoride and heated for a period of 5 hours to 250° C. in an aluminum autoclave under autogenous pressure. The product is recovered and separated from antimony salts in the same manner as described for the first step. The distilled product, which contains 8% chlorine, comprises perfluorocyclohexane and monochloroperfluorocyclohexane (11% Cl) and some dichloroperfluorocyclohexane (21% Cl), the mixed product having a boiling range from 65° to 93° C.

EXAMPLE 2

23 grams of octachloronaphthalene (M. W. 404) and 115 grams of antimony pentafluoride (M. W. 217) are heated for 4 hours at 210° C. to 215° C. in an aluminum autoclave as in Example 1. The product is drowned in an ice-hydrochloric acid mixture, separated from the aqueous solution by decantation, thinned with 20 cc. of trifluorotrichlorethane, washed with water until acid-free, separated from wash water, and finally separated from the trifluorotrichlorethane by distilling off the latter. There are obtained about 21 grams of a product boiling above 145° C. Upon distillation the product yields 10 grams of a clear colorless liquid having a boiling range of 145° C. to 175° C., 6.5 grams of a product with a boiling range of 175° C. to 205° C., and 4 grams of a liquid distilling about 205° C. The fraction boiling from 145° C. to 175° C. has a chlorine content of 16.9% and a refractive index of 1.364 (sodium-D-line) and is a mixture of partially saturated chlorofluoro-compounds. The chlorine content corresponds to an average empirical formula $C_{10}Cl_2F_{12}$. The fraction boiling above 175° C. has a refractive index of 1.383 and is preponderantly chlorofluoro compounds of higher chlorine content than the 145° to 175° fraction.

EXAMPLE 3

50 grams of octachloronaphthalene (M. W. 404) and 250 grams of antimony pentafluoride (M. W. 217) are heated at 200° C. to 205° C. for 8 hours in an aluminum autoclave. The product is drowned in an ice-hydrochloric acid mixture, separated from the aqueous solution and washed successively with hydrochloric acid and water. The washed product, amounting to 47 grams, is heated with 235 grams of fresh antimony pentafluoride at 180° C. for 8 hours in an aluminum autoclave. The product is then drowned in an ice-hydrochloric acid mixture, separated from the aqueous solution, and washed successively with hydrochloric acid and water. The product is then fractionally distilled. 28 grams of a distillate boiling in the range of 120° C. to 160° C., and mainly in the range of 140° C. to 150° C., are obtained. This product has a refractive index of 1.334 and corresponds to a mixture of octadecafluorodecalin (perfluorodecalin), monochloroheptadecafluorodecalins and dichlorohexadecafluorodecalins.

EXAMPLE 4

50 grams of perchlorodiphenyl (M. W. 499) are mixed with 200 grams of antimony pentafluoride (M. W. 217) and the mixture is heated at 250° C. for 5 hours in an aluminum autoclave. The product is removed from the autoclave and drowned in a mixture of ice and aqueous hydrochloric acid. 50 grams of trifluorotrichlorethane are added to improve the fluidity of the oil phase and the oil and water phases are then separated by decantation. The oil is washed with dilute aqueous hydrochloric acid to remove antimony salts and then fractionally distilled. The fraction boiling between 195° C. and 250° C. consists of 44 grams of oil having a refractive index of 1.390 and containing 20% chlorine.

43 grams of this product (comprising such compounds as $C_{12}Cl_3F_{13}$ and $C_{12}Cl_2F_{10}$) are mixed with 215 grams of antimony pentafluoride and heated at 185° C. for 12 hours in an aluminum autoclave. The product is recovered and distilled as in the case of the first fluorination step. From the fractional distillation, 34 grams of an oil fraction boiling from 145° C. to 188° C. are separately recovered. This oil has a refractive index of 1.327 and contains only 3% chlorine. It consists of perfluorodicyclohexyl with minor proportions of mono and di-chloro-perfluorodicyclohexyls having chlorine contents of 6% and 12% respectively and each comprising a mixture of several isomers differing from one another in respect to the positions of the chlorine atoms in relation to the cyclohexyl-cyclohexyl bond.

Pure perfluorodicyclohexyl is a solid at ambient temperatures. A part of the perfluorodicyclohexyl can be recovered from the liquid product of this example by fractional crystallization.

EXAMPLE 5

*Part A (preparation of perchloro-o,o'-diphenyl-diphenyl)*

37 grams of o,o'-diphenyl-diphenyl, 1 gram of ferric chloride and 1 gram of antimony trichloride are mixed and heated to 150° C. Chlorine gas is introduced into the mixture at a rate of about 20 grams per hour. The temperature rises to 200° C. and is maintained between 200° C. and 210° C. while chlorine is introduced at a constant rate for 24 hours. 86 grams of partially chlorinated o,o'-diphenyl-diphenyl are produced.

83 grams of this product are mixed with 250 grams of antimony pentachloride and heated at 250° C. for 5 hours in an autoclave. The product is introduced into a considerably larger volume of aqueous hydrochloric acid, filtered, washed with water to remove hydrochloric acid and dried.

The dried product is mixed with 250 grams of antimony pentachloride and heated to 250° C. for 5 hours in an autoclave. The product is then drowned in dilute hydrochloric acid solution, filtered, washed, and dried as before. 85 grams of a product comprising perchloro-o,o'-diphenyl-diphenyl are obtained of 68.4% chlorine content (Theory 68.9%).

*Part B (fluorination of perchloro-o,o'-diphenyl-diphenyl)*

84 grams of perchloro-o,o'-diphenyl-diphenyl obtained in Part A are mixed with 420 grams of antimony pentafluoride and heated at 200° C. for 5 hours in an aluminum autoclave. The reaction product is drowned in an ice-dilute hydrochloric acid mixture, 300 cc. of trifluorotrichlorethane are added and the product is filtered, producing 42 grams of filter residue of 33% chlorine content. The filtrate comprises an oil layer and an aqueous layer; the oil layer is separated, washed acid-free with water, and the trifluorotrichlorethane is distilled off. There remains 24 grams of a resinuous distillation residue containing 25% chlorine. This product is a clear, almost colorless solid at room temperature. Upon heating, it softens gradually, as the temperature rises, to form a relatively fluid oil.

40 grams of the filter residue containing 33% chlorine are mixed with 200 grams of antimony pentafluoride and the mixture is heated at 250° C., for 5 hours. The reaction product is then drowned in an ice-dilute hydrochloric acid mixture. 150 cc. of trifluorotrichlorethane are added. The oil layer is separated from the aqueous layer, washed acid-free, and separated from trifluorotrichlorethane by fractionally distilling the solvent from the oil. The product is fractionally distilled and there is recovered a distillate fraction having a boiling range, at 8 mm. of mercury absolute pressure, of 140° C. to 190° C. This fraction amounts to 33 grams and is a substantially saturated product containing only 2.5% of residual chlorine and is believed to be a mixture of perfluoro-o,o'dicyclohexyl-dicyclohexyl and isomeric monochloroperfluoro-o,o'-dicyclohexyl-dicyclohexyls.

EXAMPLE 6

80 grams of highly chlorinated 1,3,5-triphenyl-benzene (67.2% chlorine) prepared from the hydrocarbon by a procedure similar to that described in Example 5, Part A, are mixed with 480 grams of antimony pentafluoride and the mixture is heated at 250°-255° C. for 5 hours. The product is drowned in an ice-dilute hydrochloric acid mixture, thinned with trifluorotrichlorethane, separated from aqueous solution by decantation, washed acid-free with water, and fractionally distilled. A fraction amounting to 71 grams and having a boiling range, at 5 mm. of mercury absolute pressure, of 170° C. to 220° C. is separately collected. It is a pale yellow resin containing 23.6% chlorine and having properties similar to the 25% chlorine product of Example 5.

EXAMPLE 7

40 grams of perchloroterphenyl (obtained by chlorinating an o-terphenyl, m-terphenyl, p-terphenyl mixture boiling between 190° C. at 2 mm. of mercury absolute pressure and 200° C. at 1 mm. absolute pressure) and 200 grams of antimony pentafluoride were heated together in an autoclave at 250° C. for 6 hours. The reaction mixture was then poured into an ice-hydrochloric acid mixture to dissolve antimony salts; trifluorotrichlorethane was added to reduce the viscosity of the oil and the aqueous phase was separated by decantation. The oil was washed acid-free with water and then fractionally distilled. After removal of the trifluorotrichlorethane, two distillate fractions were obtained. The first, 5.5 grams, distilled in the range 130° C. to 150° C. at 8 mm. of mercury absolute pressure and had a chlorine content of 14½% and a refractive index (sodium-D-line) of 1.394; the second, 20.5 grams, distilled at 118° C. to 160° C. at 2 mm. of mercury absolute pressure and had a chlorine content of 20.7% and a refractive index of 1.428. This high-boiling fraction was mainly a clear heavy oil but the material going over toward the end of the distillation was a viscid resin-like liquid.

The first fraction comprises a mixture of perfluorochloro unsaturated tricyclic compounds containing two to four chlorine atoms and three to nine double bonds, including perfluorochloroterphenyls. The chlorine content of the oils corresponds closely to a mixture of $C_{18}Cl_3F_{21}$ and $C_{18}Cl_3F_{23}$ compounds.

The higher-boiling fraction possessed a chlorine content corresponding closely to the empirical formula $C_{18}Cl_4F_{18}$ and included a considerable proportion of this group of compounds and also $C_{18}Cl_5F_{19}$ and $C_{18}Cl_5F_{17}$ compounds.

18 grams of the high-boiling fraction and 80 grams of antimony pentafluoride were heated together at 250° C. for 6 hours. The reaction mixture was worked up as before and distilled. 11 grams of a clear liquid boiling between 45° C. at 8 mm. of mercury absolute pressure and 115° C. at the same pressure were obtained. The refractive index of this product was 1.335.

It is apparent from the low refractive index and the low boiling temperatures that the product contained compounds of a higher degree of fluorination than the low-boiling fraction of the first fluorination step. The product included the meta and para perfluorotercyclohexyls, $C_{18}F_{32}$, and their chloro substitution derivatives containing one and two chlorine atoms, as well as some degradation products.

EXAMPLE 8

50 grams of perchlorotriphenylene and 250 grams of antimony pentafluoride are heated at 225° C. for 5 hours and the product is recovered as in the preceding examples. 38 grams of a white solid are obtained of boiling range 145° C. to 200° C. at 10 mm. of mercury absolute pressure and containing 15% chlorine corresponding to a mixture of cyclic perchlorofluoro compounds of average impirical formula between $C_{18}Cl_3F_{19}$ (15.7% Cl) and $C_{18}Cl_3F_{21}$ (14.7% Cl).

EXAMPLE 9

83 grams of perchlorotriphenylamine and 500 grams of antimony pentafluoride are heated at 225° C. for 5 hours and the product is recovered as previously described. 38 grams of a yellow viscous liquid of boiling range 140° C. at 10 mm. of mercury absolute pressure to 200° C. at 2 mm. absolute pressure and containing 14% chlorine are obtained.

EXAMPLE 10

40 grams of perchloro-N-phenyl-carbazole and 240 grams of antimony pentafluoride are heated together at 200°–205° C. for 5 hours and the product is recovered as in the preceding examples. 3 grams of oil distilling below 140° C. at 10 mm. of mercury absolute pressure and 29 grams of oil distilling between 140° C. at 10 mm. of mercury and 240° C. at 5 mm. of mercury pressure were obtained. The latter product was a very thick oil containing 18% chlorine.

In a similar manner perfluorochloro oils of high boiling range and low vapor pressure at normal temperature may be obtained from perchloro-diphenylene oxide and from octachlorocarbazole. If the mixture of perchloroterphenyls of Example 7 is substituted by a solitary perchloroterphenyl, similar oils may be obtained using the ortho or meta compound, and from the para compound wax-like products may be obtained. From a highly chlorinated dinaphthylene oxide, $C_{20}H_xCl_{12-x}O$, the process yields resinous perfluorochloro products.

The terms "aromatic hydrocarbons" and "aromatic compound" as used in this specification designate compounds containing one or more aryl groups, whether or not other types of ring structures are also present.

The prefix "perfluoro" (or "perchloro"), as applied to a compound, indicates that fluorine (or chlorine) is substituted for each of the hydrogen atoms ordinarily present in such compounds, except as otherwise indicated by substituents specifically identified by further prefixes to the term "perfluoro" (or "perchloro") in the name of the compound. Similarly, the prefix "perfluorochloro" indicates that all of the hydrogen atoms in said compound have been replaced by fluorine and chlorine.

It will be understood that I intend to include variations and modifications of the invention and that the preceding examples are illustrations only and in no wise to be construed as limitations upon the invention, the scope of which is defined in the appended claims, wherein I claim:

1. The process of making cyclic organic fluorine compounds having at least one fluorinated alicyclic 6-carbon ring which comprises heating antimony pentafluoride at a temperature between 100° C. and 300° C. with a chlorinated aromatic compound having at least one 6-carbon ring and having at least three-fourths of the hydrogen of the corresponding hydrocarbon replaced by chlorine, said reaction resulting in the replacement of chlorine atoms by fluorine atoms as well as the addition of fluorine atoms to saturate aromatic double bonds, drowning the reaction mixture in a dilute aqueous hydrochloric acid ice mixture to dissolve antimony salts, adding trifluorotrichlorethane thereto to improve the fluidity of the organic phase, separating the organic and aqueous phases by decantation, washing the organic phase, and then fractionally distilling the organic phase to separate trifluorotrichlorethane from the fluorinated organic reaction product.

2. A process as defined in claim 1, in which the chlorinated aromatic compound is perchlorobenzene.

3. A process as defined in claim 1, in which the chlorinated aromatic compound is perchloronaphthalene.

4. A process as defined in claim 1, in which the chlorinated aromatic compound is perchlorodiphenyl.

5. A process as defined in claim 1, in which the chlorinated aromatic compound contains from 18 to 24 carbon atoms all as members of 6-carbon rings and has at least all but two of the hydrogen atoms of the parent hydrocarbon replaced by chlorine.

FREDERIC B. STILMAR.

REFERENCES CITED

The following references are of record in the file of this patent:

UNITED STATES PATENTS

| Number | Name | Date |
|---|---|---|
| 2,090,772 | Wiezerch | Aug. 24, 1937 |
| 2,426,172 | Benning | Aug. 26, 1947 |
| 2,432,997 | Ligett et al. | Dec. 23, 1947 |

OTHER REFERENCES

Henne et al., Jour. Am. Chem. Soc., vol. 67, 1235-7 (1945).

Bigelow et al., Jour. Am. Chem. Soc., vol 56, 2773-4 (1934).

McBee et al., Ind. Eng. Chem., vol. 39, 380-4 (1947).

Stilmar et al., Ind. Eng. Chem., vol. 39, 348-50 (1947).